United States Patent [19]
Wright

[11] Patent Number: 5,984,331
[45] Date of Patent: Nov. 16, 1999

[54] REMOVABLE MOUNTING PLATE FOR SISSY BAR

[76] Inventor: John M. Wright, 5629 Lovers La., Dallas, Tex. 75209

[21] Appl. No.: 09/096,882

[22] Filed: Jun. 12, 1998

Related U.S. Application Data

[63] Continuation-in-part of application No. 29/084,560, Mar. 5, 1998.
[60] Provisional application No. 60/063,464, Oct. 29, 1997.

[51] Int. Cl.⁶ .......................................................... B62J 7/00
[52] U.S. Cl. ........................................ 280/202; 280/288.4
[58] Field of Search ............................ 180/219; 280/202, 280/847, 848, 152.1, 304.4, 288.4; D12/114, 117, 119; 297/195.1, 215.1, 215.11, 215.12, 352; 224/413

[56] References Cited

U.S. PATENT DOCUMENTS

| | | | |
|---|---|---|---|
| D. 271,867 | 12/1983 | Danielson | D12/119 |
| D. 385,515 | 10/1997 | Gogan et al. | |
| D. 386,131 | 11/1997 | Gogan et al. | |
| 2,754,891 | 7/1956 | Barron | 297/352 |
| 3,850,353 | 11/1974 | Foulds | 280/202 |
| 3,913,974 | 10/1975 | Bowen | 280/202 |
| 4,030,750 | 6/1977 | Abram | 297/375 |
| 4,111,448 | 9/1978 | Sklodowsky | 280/202 |
| 4,311,261 | 1/1982 | Anderson et al. | 224/31 |
| 4,826,057 | 5/1989 | Yamada | 224/32 |
| 4,953,911 | 9/1990 | Hanagan | 297/215.12 |
| 4,993,731 | 2/1991 | Fuller | |
| 5,322,345 | 6/1994 | Desser et al. | 297/214 |
| 5,468,052 | 11/1995 | Vaughn | |
| 5,558,260 | 9/1996 | Reichert | 224/413 |
| 5,667,232 | 9/1997 | Gogan et al. | |
| 5,762,249 | 6/1998 | Hann | 224/430 |
| 5,779,303 | 7/1998 | Kuelbs et al. | 280/202 |

*Primary Examiner*—Lanna Mai
*Assistant Examiner*—Michael Cuff
*Attorney, Agent, or Firm*—Haynes and Boone, LLP

[57] ABSTRACT

The present invention relates to a mounting plate that is secured to a rear fender of a motor cycle to hold a sissy bar. The plate is secured to the rear fender using pre-existing holes in the rear fender. The plate comprises a first curved portion, a second curved portion integral with the first curved portion and located at one end of the plate and defining a plurality of holes therein, and a third curved portion integral with the first curved portion and located at an opposite end of the plate and extending perpendicular to a longitudinal axis of the plate. Attached to the third curved portion is a pair of mounting brackets for retaining the sissy bar.

3 Claims, 2 Drawing Sheets

REMOVABLE MOUNTING PLATE FOR SISSY BAR

CROSS REFERENCE TO EARLIER FILED APPLICATIONS

This application relies on U.S. Provisional Patent Application No. 60/063,464 filed Oct. 29, 1997; furthermore, this application is a continuation-in-part of Design patent application Ser. No. 29/084,560, filed Mar. 5, 1998, now pending.

BACKGROUND OF THE INVENTION

This invention relates in general to a mounting plate for motorcycles and, more specifically, to a plate mounted to a rear fender of a motorcycle for receiving a sissy bar with a back support.

Back supports, typically referred to as "sissy bars", are mounted to motorcycles to provide support for passengers. Current methods of securing sissy bars to a motorcycle require extensive disassembly of the cycle's rear fender and the mounting of side plates. This disassembly typically involves removing of frame struts, shock absorbers, rear turn signals and often the rear wheel. Once the mounting components are attached, the components typically remain secured to the rear fender and are not easily removed. If the components are removed, the paint job of the cycle is typically impaired due to chipped paint from contact of the sissy bar side plates with the cycle resulting in a visually unpleasant appearance. For collectors of motorcycles which show or display their cycles, such visual flaws are unacceptable.

Furthermore, once the typical alterations for mounting a traditional sissy bar side plate system are completed, extensive assembly and disassembly is required each time the sissy bar is mounted or removed, respectively. Also, most mounting units have multiple parts and components which can be easily lost when the unit is removed for storage.

Therefore, what is needed is a single mounting plate that can be easily secured to the rear fender of a motorcycle to hold a sissy bar and for which removal will not result in an aesthetically unpleasant appearance.

SUMMARY OF THE INVENTION

The present invention, accordingly, provides a mounting plate that is secured to a rear fender of a motorcycle to hold a sissy bar. The plate is secured to the rear fender by screws engaged into pre-existing holes in the rear fender. Additionally, the plate is relatively hidden to avoid aesthetically unpleasant appearances. To this end, the plate, having a fender side and a seat side for mounting onto a rear fender of a motorcycle and for receiving a pair of arms of a sissy bar, comprises a first curved portion; a second curved portion integral with the first curved portion and located at one end of the plate and defining a plurality of holes therein; and a third curved portion integral with the first curved portion and located at the opposite end of the plate and extending perpendicular to a longitudinal axis of the plate and defining a support bracket for retaining the arms of the sissy bar.

An advantage of the present invention is that it allows the user to mount a single component, the plate, onto the rear fender without disassembly of the rear fender. Furthermore, the plate fits under the seat and, thus, is relatively hidden from view so that when the sissy bar is removed, the plate will not detract from the aesthetic appeal of the motorcycle.

DETAIL DESCRIPTION OF THE INVENTION

Figure 1:
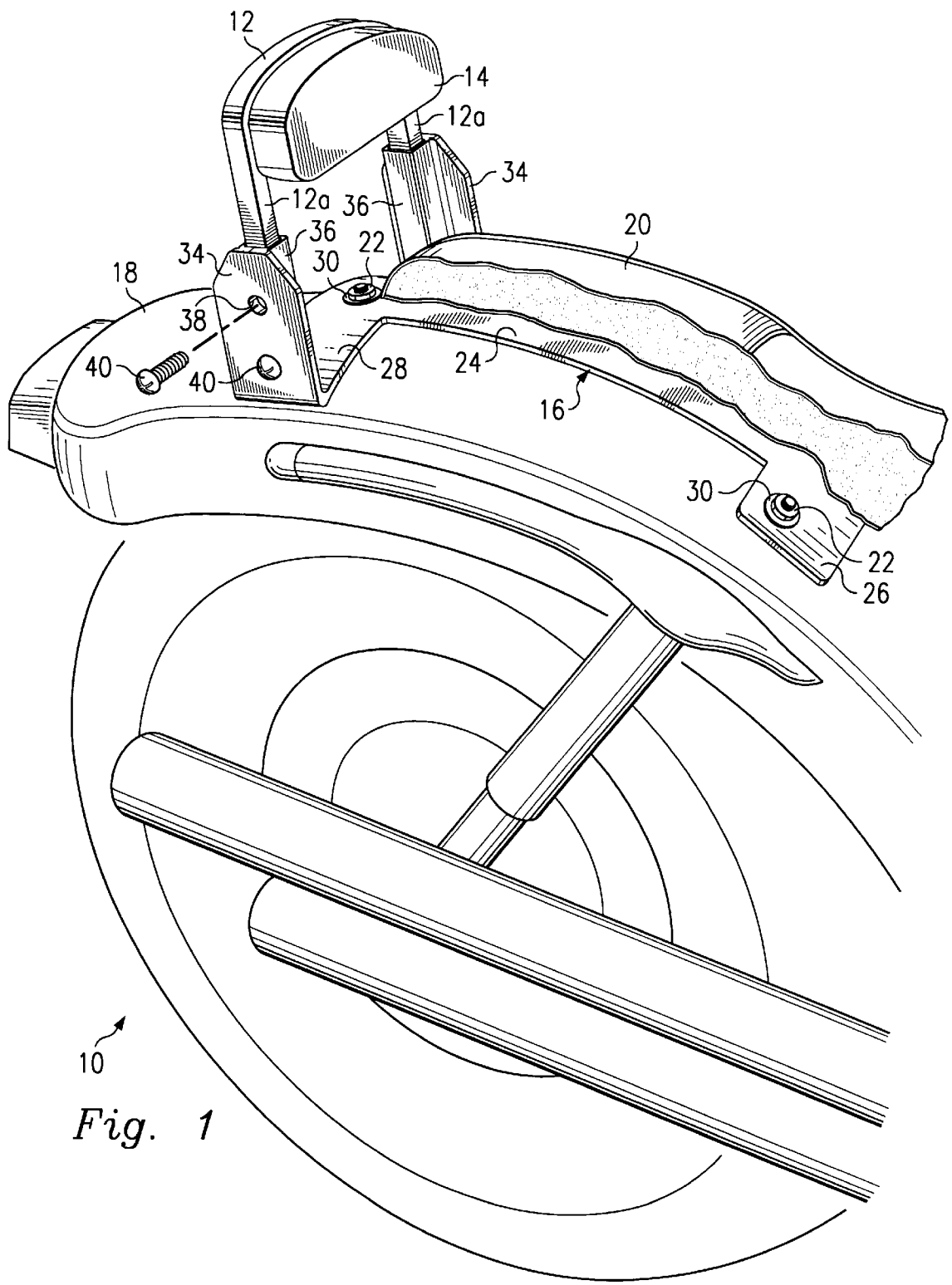
FIG. 1 is a perspective view of a rear portion of a motorcycle with the seat in cut-away to show a mounting plate, in accordance with the present invention, installed on the rear fender of the motorcycle.

Referring to FIG. 1, a motorcycle, generally designated 10, is shown with a passenger back support 12, commonly referred to as a "sissy bar", having two downwardly extending mounting arms 12a and an attached forwardly facing (relative to the direction of the motorcycle 10) pad 14. The back support 12 is attached to the motorcycle 10 by engaging the arms 12a to a mounting plate 16 secured on top of a rear fender 18 of the motorcycle 10 and beneath a seat 20. The pad 14 is designed to fit the small of the back of a passenger on the motorcycle 10 to provide support during riding.

Figure 2:
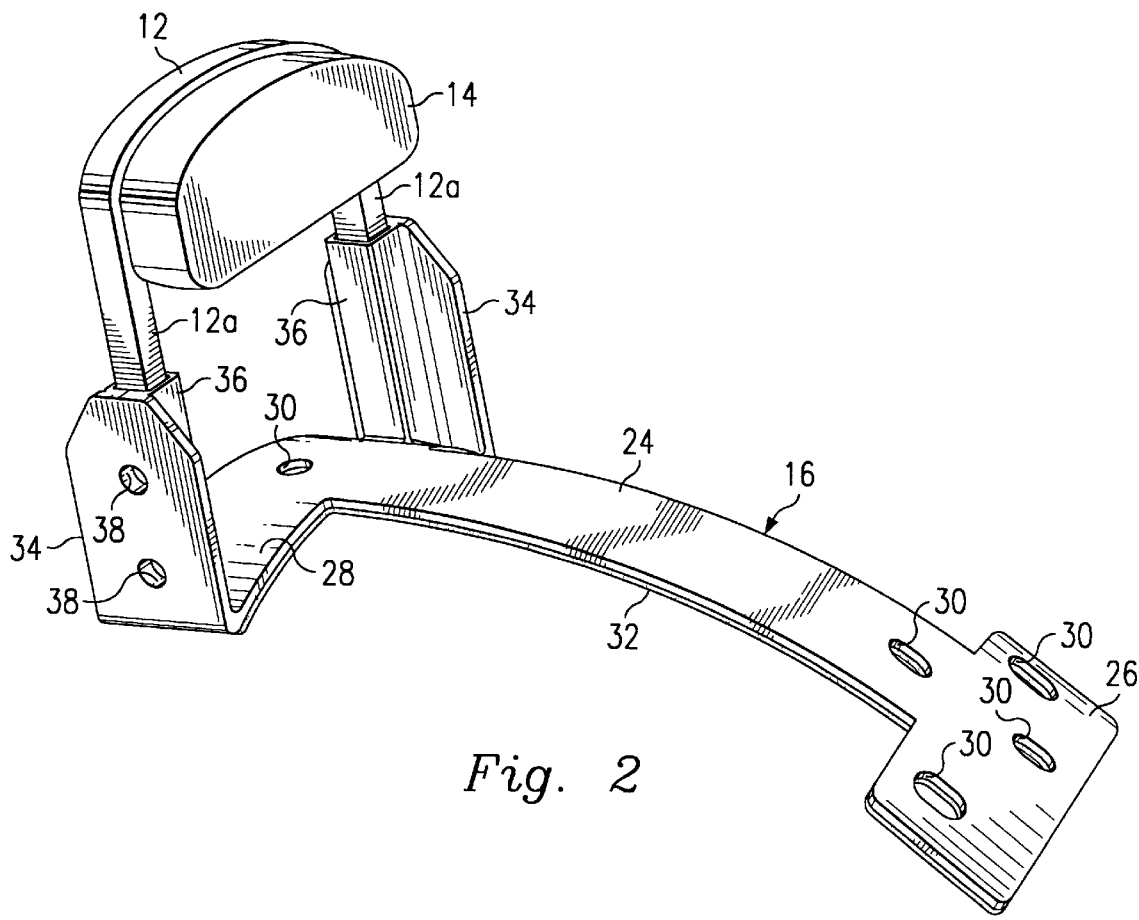
FIG. 2 is a perspective view of the plate and sissy bar shown in FIG. 1.
Figure 3:
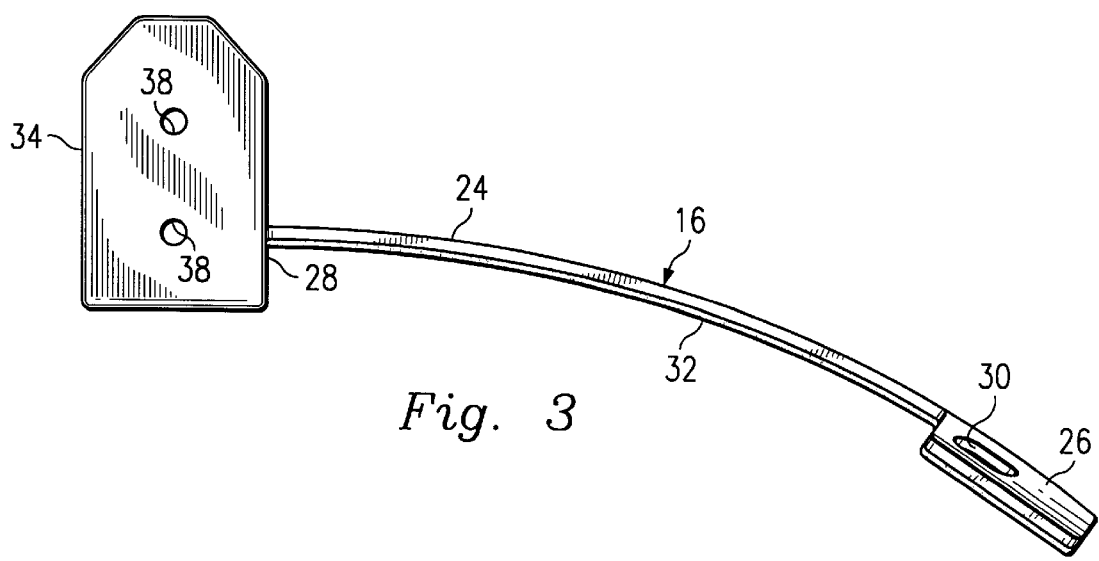
FIG. 3 is a side view of the plate of FIG. 1.

Referring now to FIGS. 2 and 3, the plate 16 is made of a rigid material, such as steel, to have sufficient structural strength to support the force created by the passenger on the pad 14. The plate 16 comprises three curved regions, 24, 26 and 28, each shaped to correspond to the curvature of the rear fender 18. More particularly, the curved region 24 is concave with respect to a fender side of the plate 16 and convex with respect to a seat side of the plate 16. Furthermore, curved region 26 disposed at the proximal end of the plate 16 conforms to the shape of the rear fender 18 in a direction transverse the axis of the curved region 24. Likewise, the curved region 28 disposed at the distal end of the plate 16 under the back support 12 conforms to the shape of the rear fender 18 in a direction parallel to the curved region 26. The curved regions 24, 26 and 28 of the plate 16 generally form an I-shaped member and can be formed from a single piece of material, or can be separately formed and then welding together by known techniques to form an integral piece.

As shown in FIG. 2, the plate 16 has a plurality of holes 30 located at opposite ends of the plate 16 in or near the curved regions 26 and 28. To accommodate the variety of rear fender designs, the holes 30 are located in predetermined positions to matingly correspond to various pre-existing holes (not shown) found in various rear fender designs, especially the rear fender designs of Harley Davidson® motorcycles. For certain motorcycles, an additional hole in the fender might be required for securing the plate 16. Accordingly, installing the plate 16 will not typically require altering the rear fender 18 or drilling new holes in the rear fender 18. Thus, the plate 16 can be secured to a variety of rear fender designs, such as the rear fender 18, without damaging the rear fender 18, by employing screw and washer sets 22 (FIG. 1), or other known connectors, through the holes 30 aligned with the pre-existing holes in the rear fender 18. It should be understood that not all of the holes 30 will be used for any particular motorcycle 10, but only those corresponding to the pre-existing holes in the rear fender of such motorcycle. A protective spacer 32 made of a soft and compressible polymer compound is preferably secured to the fender side of the plate 16 having corresponding holes to the holes 30 to ensure a flush connection of the plate 16 to the rear fender 18.

Extending upwardly from the curved region 28 of the plate 16 in a substantially vertical position are a pair of sidewalls 34 integrally formed with or fixedly joined to the plate 16. A hollow mounting sleeve 36 is secured in a conventional manner to each of the sidewalls 34 and disposed for receiving the arms 12*a* of the back support 12. The arms 12*a*, the sidewalls 34, and the sleeves 36 each have a pair of aligned holes 38 for receiving screws 40 (FIG. 1) to fixedly secure the arms 12*a* to the sleeves 36, and thus to the plate 16. The screws 40 can be designed to required a special tool for removal, thereby deterring theft of the back support 12.

It is understood that several modifications, changes and substitutions are intended in the foregoing disclosure and in some instances some features of the invention may be employed without a corresponding use of other features. For example, various types of compressible foam can be utilized for the protective spacer 32, or it may be eliminated in its entirety. Furthermore, the thickness and material of the plate 16 can be varied so long as sufficient structural strength is maintained. Also, the location of the holes 30 can be changed to align with pre-existing holes of other rear fender designs. Accordingly, it is appropriate that the appended claims be construed broadly and in a manner consistent with the scope of the invention.

What is claimed is:

1. A bracket assembly comprising:

a plate comprising:
- (i) a longitudinally curved member,
- (ii) an axially curved flange attached to a first end of the longitudinally curved member, and
- (iii) two external mounting brackets attached to a second end of the longitudinally curved member, wherein the mounting brackets are oriented orthogonal to the longitudinally curved member; and a back support removably attached to the two mounting brackets.

2. The assembly of claim 1 wherein the plate has a plurality of holes associated with the flange and mounting brackets.

3. The assembly of claim 1 further comprising a compressible member affixed to a concave side of the longitudinally curved member.

* * * * *